Oct. 11, 1960   G. E. WINTERMUTE ET AL   2,955,972
METHOD OF FORMING PADDED ARTICLES
Filed April 29, 1957   2 Sheets-Sheet 1
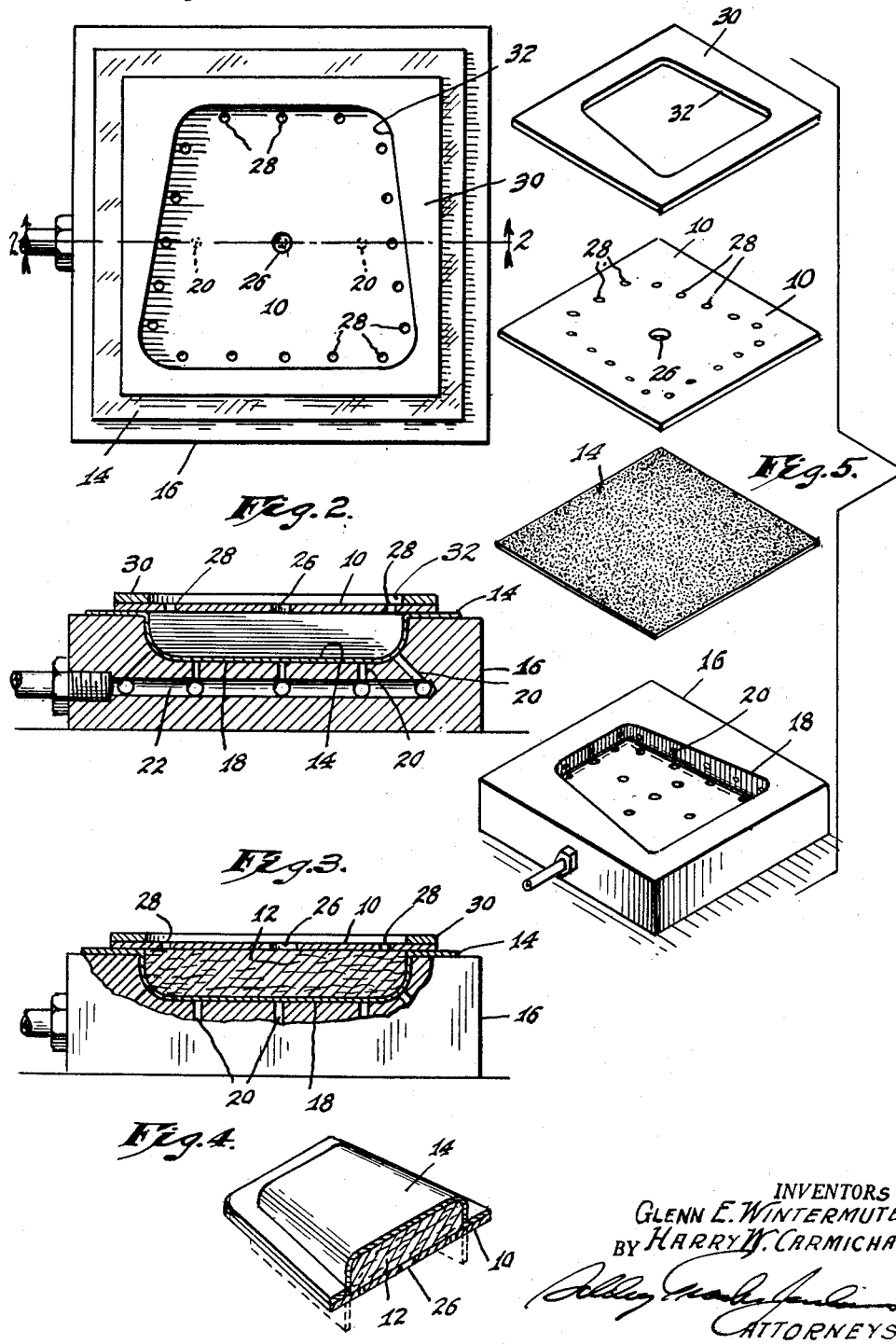
INVENTORS
GLENN E. WINTERMUTE &
BY HARRY W. CARMICHAEL,
ATTORNEYS.

Oct. 11, 1960    G. E. WINTERMUTE ET AL    2,955,972
METHOD OF FORMING PADDED ARTICLES
Filed April 29, 1957    2 Sheets-Sheet 2
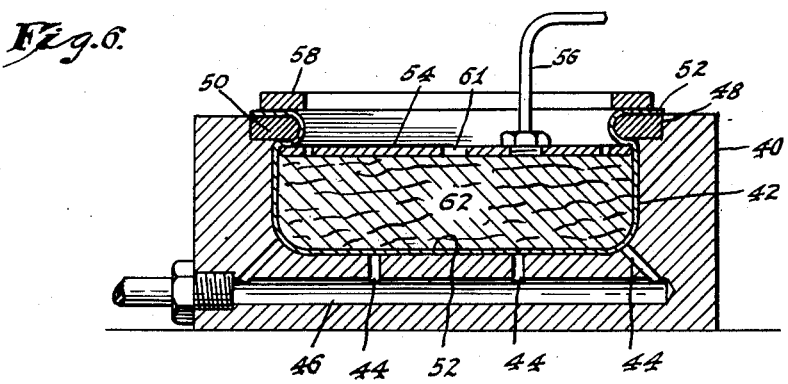
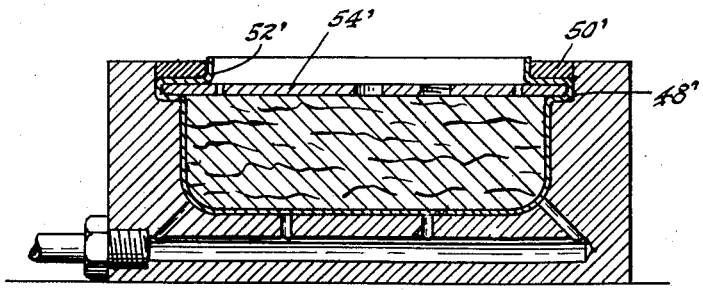
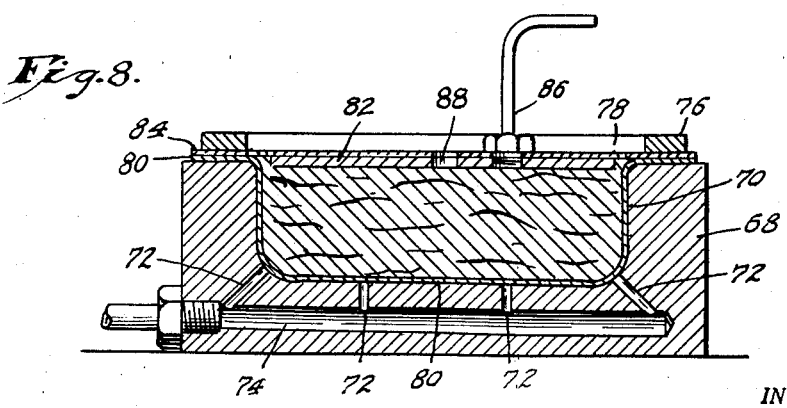
INVENTORS
GLENN E. WINTERMUTE
BY HARRY W. CARMICHAEL,
ATTORNEYS.

United States Patent Office 2,955,972
Patented Oct. 11, 1960

2,955,972

METHOD OF FORMING PADDED ARTICLES

Glenn E. Wintermute and Harry W. Carmichael, Columbus, Ind., assignors to Arvin Industries, Inc., Columbus, Ind., a corporation of Indiana Filed Apr. 29, 1957, Ser. No. 655,630

2 Claims. (Cl. 154—110)

This invention relates to the manufacture of covered foam-elastomer pads and especially to the production of an article in which the pad is associated with a sheetmetal or other supporting member to which the pad-covering or skin is bonded. Heretofore such pads have usually been produced by one or the other of two general methods. In one of such methods, a sheet of thermoplastic material which is to form the skin on the pad is held over a mold cavity and distended thereinto by the hydrostatic pressure of a foaming latex which is then cured in place, the pressure being maintained during the curing operation to keep the skin in contact with the mold and thus insure production of a pad of desired shape. In the other method a sheet of the thermoplastic skin material, after being formed to provide in it a pocket corresponding in shape to the desired pad, is cooled and the foaming latex is introduced into the formed pocket and cured, the pocket serving as a mold.

Both such methods have certain disadvantages. In the first, in order to insure filling of the mold, to provide the desired resilience and/or to prevent distortion of the pad under the influence of residual internal stresses after the pad has been removed from the mold, it is necessary that the hydrostatic pressure of the foaming latex be rather accurately controlled during the curing operation. In the second method it is necessary to use a relatively expensive latex which will cure at low temperature; for the preformed skin would soften and lose its shape under high temperatures. Some of the problems incident to the practice of both methods can be alleviated in part by using relatively thick material for the covering or skin; but a thick skin tends to reduce the resilience of the pad in the finished article.

One object of this invention is to produce economically, and in quantity, foam-elastomer pads substantially uniform in shape and resilience and having a covering which may be relatively thin and flexible. Another object is to produce a padded article comprising a foam-elastomer pad, a rigid backing or support therefor, and a skin, with the skin and support bonded to the pad and joined to each other.

In carrying out the invention, we lay a sheet of skin-forming thermoplastic material over a die having a cavity corresponding in shape to the desired pad. While such sheet is held against the face of the die beyond the margin of the cavity, air is exhausted from the cavity to cause the skin to be distended into contact with the walls of the cavity, a foaming elastomer latex is introduced into the pocket formed by the distended skin, and such latex is then cured. The vacuum is maintained on the mold cavity until the elastomer has cured to a degree such that it is capable of maintaining the skin distended, and during the curing the elastomer composition is permitted to expand freely to prevent the creation of any substantial superatmospheric pressures within it. In most instances, the pocket formed by the distended skin is closed by a metal plate to which marginal portions of the skin beyond the limits of the pad will be secured, such plate being perforated within the border of the pocket to permit free escape of any excess elastomer composition. Desirably, the face of the plate in contact with the pad is coated with an appropriate adhesive so that the finished pad will be bonded to the plate and the marginal portions of the skin are secured to the plate simultaneously with formation of the pad, to produce an integral structure.

The accompanying drawings illustrate our invention. In such drawings:

Fig. 1 is a top plan of a die assembly used in forming a padded article according to our invention;

Fig. 2 is a cross section taken on the line 2—2 of Fig. 1;

Fig. 3 is a view similar to that shown in Fig. 2 but showing the curing operation with the pad being formed between the skin and panel;

Fig. 4 is a fragmentary isometric view of a finished padded article;

Fig. 5 is an exploded view of the die assembly shown in Fig. 1; and

Figs. 6 through 8 are views similar to Fig. 3, but showing different embodiments of our invention.

The chair seat illustrated in Figs. 1 to 5 is shown to illustrate one way in which our invention may be practiced in the production of an article wherein a rigid structural member extends well beyond the margin of the pad to provide a substantial pad-bordering area to which is bonded the skin that covers the pad. In such an embodiment, a metal panel 10 forming the basic structural member of said seat is provided with a foam-elastomer pad 12 integrally bonded between said panel and a flexible plastic skin 14 similarly bonded to said pad and the panel 10 and forming a covering for the pad and that portion of the panel beyond the border of the pad.

In forming our padded panel construction, we employ a die 16 provided with a die-cavity 18 having a configuration corresponding to the shape of the pad to be produced. Appropriately disposed within said cavity are a plurality of openings 20 interconnecting said cavity through suitable passages 22 to a vacuum pump for evacuating the air from said cavity.

The skin 14 may be of any flexible, stretchable sheet material; but we prefer to use a thin sheet of a plastic, such as polyvinylchloride, because of its forming characteristics and its relatively great tensile strength over the wide range of temperatures necessary for curing the foam-elastomer compositions used to form the pad 12. In all illustrated embodiments of our invention, the skin 14 is laid over the die-cavity and clamped to the die at or beyond the edge of the cavity; and then, with the die heated sufficiently to soften the material of the skin, the cavity is exhausted to distend the skin into contact with the cavity walls.

In Figs. 1 to 5, where the base 10 extends well beyond the margins of the pad, such base is laid in proper position on the skin 14 before the mold cavity is evacuated. Such base has a sprue hole 26 for the introduction of the pad-forming material and preferably also has a plurality of other holes 28 distributed within the edges of the die-cavity. As the marginal portions of the skin 14 and base are to be bonded together, one of their interengaging faces is coated with an appropriate adhesive material. Conveniently, the adhesive is a thermoplastic, such as a vinyl polymer, applied in heated condition to the entire lower face of the base 10 and permitted to cool and solidify before the base is laid on the die over the skin 14. The skin and the panel 10 superposed on it are firmly clamped against the die-face by a clamp plate 30 having a centrally disposed opening 32 at least large enough to contain within its margin the openings 26 and 28.

With the clamp plate 30 forced downwardly by any appropriate means (not shown), to clamp the marginal portions of the skin and base together, the die-cavity 18 is vacuumized, the air leaving said cavity through the openings 20 and the vacuum connections 22. This vacuumization distends that portion of the skin 14 that overlies the cavity into said cavity, with said skin supported against the cavity walls for the reception of the foam-elastomer composition forming the pad 12. Prior to and during the vacuumization, the die 16 is heated to soften the adhesive which integrally bonds together the panel 10 and the undistended peripheral skin areas retained on the die by the top clamp 30. This heating operation further serves to render the unbonded skin area more pliable and stretchable so that it may be more easily distended into the die-cavity 18 and lie against the walls thereof.

With the skin held distended in the cavity 18, a foam-elastomer, desirably a synthetic latex composition including a foaming agent, is introduced through the sprue hole 26 into the void between the panel 10 and the distended skin. After the desired amount of the elastomer has been introduced, the die is further heated to foam and cure said elastomer into the spongy resilient pad 12 integrally bonded to said skin and panel. Any excess of the foamed elastomer escapes through the holes 26 and 28, and therefore the foaming does not generate any superatmospheric pressure in the pad. By forming said pad with the skin distended under the vacuum and in the absence of internal pressure, the foaming action of the elastomer foaming agent is uninhibited and thereby produces a pad 12 which has a uniform density and resiliency, and which will possess a stable shape when removed from the die. Furthermore, the distended skin is supported by the cavity walls during the curing operation; thus permitting the use of an extremely thin skin with a relatively high curing temperature that would distort and rupture an unsupported skin.

When the curing operation is completed, the vacuum is released and the clamp plate 30 removed permitting the skin covered panel, now having the pad 12 formed therein, to be removed from the die 16. Any desired forming operation, such as stamping or drawing, may then be performed on the marginal edges of the panel 10 extending laterally beyond the pad 12 without disturbing the laminating bonds between the panel, the pad, and the skin. For example, such marginal edges may be deformed downwardly to form a peripheral stiffening flange, as indicated in dotted lines in Fig. 4.

Figs. 6 through 8 show modifications of our process which employ variations in the method of joining the skin and panel into an integral unit.

Fig. 6 shows a method suitable for use where the base member does not extend beyond the border of the pad. In such a case we may employ a die 40 having a die-cavity 42 provided with a plurality of openings 44 communicating with suitable vacuum connections 46, as before; but in this instance the top of the die-cavity 42 is recessed or rabbeted, as at 48, to receive a retainer ring 50 projecting inwardly beyond the edges of said cavity.

A flexible plastic skin 52 is placed over the lower face of a base panel 54, its margin is turned inwardly over adhesive-coated edge portions of the upper face of the panel 54, and the latter is positioned in the mouth of the die-cavity by an appropriate supporting member 56. The ring 50 is then put in place in the recess 48 over the inturned edges of the skin, the skin is turned outwardly over such ring, and a clamp plate 58 is then applied to secure the extreme edge portion of the fabric and to hold the ring 50 in its seat. The skin 52 is then distended into the die-cavity by vacuumizing said cavity through the openings 44 and 46. Upward effort exerted on the support 56 clamps the skin between the base 54 and the ring 50 bonds the skin to the back of the base through the medium of the adhesive referred to above.

With the skin and panel retained in this position, a foam-elastomer, desirably a synthetic latex composition including a foaming agent, is introduced through a panel sprue hole 61 into the void between said panel and the distended skin. The die is then heated to foam and cure said elastomer into a spongy resilient pad 62 integrally formed between the skin and panel. Preferably, as before, the adhesive used to secure the skin to the back of the panel is thermoplastic, and a preliminary heating operation is employed to soften both the adhesive and the skin. The lower face of the panel may be coated with the adhesive to provide a bond between it and the pad.

In this manner an integrated padded panel is produced in which the skin is integrally bonded to the panel 54 on the side of said panel opposite the pad 62 without forming any seams or creases in the skin on the padded face of said panel.

Fig. 7 shows a variation in the skin-panel bonding like that shown in Fig. 6, except that the panel 54' projects a short distance beyond the edges of the pad so that it, as well as the skin 52', will be disposed in the recess 48' and held therein by the ring 50' with the skin 52' overlapping the adhesive coated marginal edges of both faces of said panel. In this manner the skin 52' is laminated to the peripheral edges of both faces of panel to insure a permanent bond between said skin and the panel. Since in this arrangement the base 54' is supported by the base of the recess 48', the support 56 of Fig. 6 is not required.

Fig. 8 shows still another variation in the method of forming the skin-panel bond similar to the method shown in Fig. 6 in that the base panel does not extend beyond the pad-margin. In this embodiment, we employ a die 68 having a die-cavity 70 which, as in the other instances, is provided with a plurality of openings 72 communicating with suitable vacuum connections 74; but in this instance there are no counterparts for the rabbeting 48 and ring 50. The die is provided with a clamp plate 76 adapted to be received peripherally around the top of said cavity for securing the covering material against the die, and provided with a centrally disposed opening 78.

A flexible plastic skin 80 is disposed over the die 68 with its marginal edges extending laterally beyond the cavity 70 and lying on the upper face of the die. A second sheet of the plastic skin material 82 is cemented to the upper face of a panel 84, and the latter is held in the mouth of the die by an appropriate supporting member 86, with the edges of the sheet 82 overlying the edges of the sheet 80. After the clamp-plate 76 is applied to clamp the edges of the sheets 80 and 82 between it and the die, the cavity 70 is vacuumized through the passages 72, 74 to distend the skin 80 into the die-cavity, whereupon the foam-elastomer composition may be introduced, foamed, and cured, as before. Before disposing the panel 84 and the sheet of skin material 82 on the die, an appropriate adhesive is applied to one or both of the marginal portions of the two sheets of skin material, so that the margins of such sheets will be firmly bonded together as a result of the pressure exerted by the clamp plate 76. As in the previous instances, such adhesive may be thermoplastic in character to be softened by heat either in a preliminary heating operation which also softens the skin 80 to further its conformation to the walls of the die-cavity or in the foaming and curing in operation.

After the pad has been cured, the assembly of pad, panel, and two skins is removed from the mold, and the united edges of the two skins may be trimmed close to the edges of the panel 84 leaving a narrow fin of double-thickness forming an integral connection between the skin 80 and the skin 82.

Reference has been made above to the effect of heat in softening the pad-covering to increase its pliability and promote its distention into contact with the cavity walls. In practice, it will usually be unnecessary to employ a separate, preliminary heating for that purpose since, in continuous operation of the equipment, the die will retain from the foaming and curing operation enough heat to adeqautely soften the skin.

We prefer that the pad-forming material introduced into the pocket formed by the distended skin be unfoamed material containing a foaming agent; but if desired a pre-foamed material may be used.

We claim as our invention:

1. In a method of making a laminated, foam-elastomer padded article, the steps of positioning a sheet of flexible pad-covering material over a die-cavity having the form of the pad to be produced with the margins of said material disposed over a die face beyond the margins of the die cavity, clamping said pad-covering material in fixed position thereon, heating said die to increase the flexibility of said material and exhausting the die-cavity while in heated condition to cause the portion of said material overlying the die-cavity to be distended thereinto against the cavity walls to form a pocket, supporting a flat, adhesive coated rigid panel on said die against the margins of said skin introducing a foam-elastomer composition into said pocket, and curing said composition into foamed condition while maintaining a vacuum on the cavity to retain the pad-covering material in distended condition, said panel and pad-covering material being bonded together along their marginal edges prior to the completion of the curing operation, and the foam-elastomer being bonded to the opposed faces of the panel and pad-covering material, said skin being retained in a fixed supported position in the die cavity during the curing step.

2. A method as set forth in claim 1 with the additional step of bringing the marginal portions of the pad-covering material around the edges of the panel, and bonding such material to the front and rear faces of the panel.

References Cited in the file of this patent

UNITED STATES PATENTS

| | | |
|---|---|---|
| 1,565,582 | Moore | Dec. 15, 1925 |
| 2,299,908 | Leash | Oct. 27, 1942 |
| 2,338,490 | Cunnington | Jan. 4, 1944 |
| 2,753,642 | Sullivan | July 10, 1956 |
| 2,771,612 | Samuels | Nov. 27, 1956 |
| 2,785,440 | Toulmin | Mar. 19, 1957 |
| 2,801,199 | Meyers | July 30, 1957 |
| 2,878,524 | Fink | Mar. 24, 1959 |